Nov. 8, 1960     E. J. DEUTSCH     2,959,185
AUTOMATIC BLEED DEVICE FOR PNEUMATIC SYSTEM
Filed Jan. 17, 1957
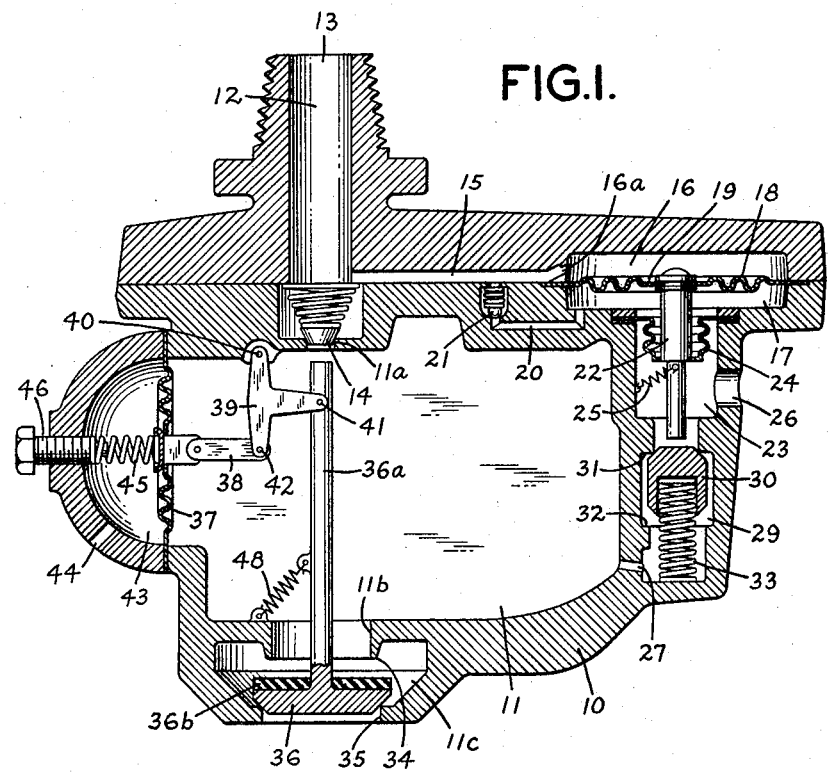
INVENTOR
Edward J. Deutsch
BY
HIS ATTORNEYS

United States Patent Office 2,959,185
Patented Nov. 8, 1960

2,959,185

AUTOMATIC BLEED DEVICE FOR PNEUMATIC SYSTEM

Edward J. Deutsch, Bellmore, N.Y., assignor to Fairchild Engine and Airplane Company, Bay Shore, N.Y., a corporation of Maryland Filed Jan. 17, 1957, Ser. No. 634,762

18 Claims. (Cl. 137—204)

This invention relates to a mechanism for automatically bleeding fluid systems and, more particularly, to a mechanism for bleeding moisture periodically and automatically from pneumatic systems.

In pneumatic systems, the compression of the gaseous fluid tends to condense moisture, and the accumulation of moisture in a pneumatic system may result in faulty operation of the system, unless the entrapped moisture is bled from time to time. For example, in air brake systems the accumulation of moisture in the system may result in faulty operation of the brakes, particularly in cold weather. It is well known that many serious accidents have been caused by brake failure due to ice forming in the system.

In an effort to prevent brake failure caused by the accumulation of moisture in the system, a procedure has been established by many trucking companies, charging the drivers with the responsibility of bleeding the system at frequent intervals on the road. Unfortunately, this important operation is frequently forgotten or ignored due to the inconvenience of bleeding the system manually, particularly during cold weather, and the inaccessibility of the brake tanks. As a consequence, and notwithstanding the grave consequences that might ensue, many vehicles are operated under extremely precarious conditions, endangering not only costly equipment and cargo but the lives of the drivers and innocent bystanders as well.

The present invention provides a mechanism which periodically bleeds entrapped moisture from a pneumatic system automatically, thus making it unnecessary for an operator to do this manually. The mechanism is compact, efficient and dependable, and is readily applicable to existing pneumatic systems.

For a complete understanding of the present invention, reference may be made to the detailed description which follows and to the accompanying drawings in which:

Figure 1 is a cross-sectional elevation view of the mechanism of the present invention; and Figure 2 is an enlarged fragmentary view of a portion of the mechanism shown in Figure 1 but illustrating an alternative embodiment thereof.

Referring to the drawings, the mechanism comprises a housing 10 containing a pressure chamber 11 therein. The housing is provided with an upwardly extending threaded fitting 12 which may be threadably coupled to the storage tank of a pneumatic system so that the conduit 13 therein will be in communication with the gaseous fluid or air within the storage tank. The lower end of the conduit 13 communicates with the pressure chamber 11 through an inlet port 11a which is normally closed by a spring-urged valve 14. The lower end of the conduit 13 also communicates with a passage 15. The passage 15, in turn, communicates with a chamber 16 through a restricted orifice 16a and with a chamber 17 through a passage 20 containing a spring-urged check valve 21. The size of the orifice 16a, as shown in Figure 2, can be regulated by an adjustable needle valve 16b having its outer end accessible from outside the housing 10. The chambers 16 and 17 are separated by a flexible diaphragm 18 which contains a small vent 19 therein.

A plunger 22 is affixed to the flexible diaphragm 18 so that movement of the diaphragm due to a differential pressure on opposite sides thereof imparts axial displacement to the plunger. The plunger extends downwardly through a chamber 23 disposed beneath the chamber 17, but the chambers 17 and 23 are sealed off from each other by the flexible, expandable, bellows-like seal 24, one end of which is affixed to the portion of the housing 10 which defines the wall of the chamber 23 and the other end of which is affixed to the movable plunger. One or more springs 25 act on the plunger 22 to impart to the plunger a quick-acting downward displacement. The chamber 23 is vented to atmosphere by a port 26.

The pressure chamber 11 communicates with the port 26 through a restricted passage 27 and a passage 29 which discharges into the chamber 23. Flow through the conduit 29 is regulated by a double acting valve 30, the movement of which is limited in one direction by a valve seat 31 and the movement in the other direction by a shoulder 32. The valve 30 is urged by a compression spring 33 into or against the valve seat 31. The valve, however, may be shifted against the action of the spring 33 toward or into engagement with the shoulder 32 by the downward displacement of the plunger 22.

The bottom of the housing 10 contains a discharge port 35 through which moisture which has accumulated in the pressure chamber 11 may be expelled from time to time. The discharge port 35 is normally closed by a valve 36. The perimeter of the discharge opening 35 serves as a valve seat for the valve when it is in engagement therewith. The valve, when opened, is displaced from the valve seat inwardly, and the movement of the valve is limited by an inner valve seat 34. The upper surface of the valve 36 carries a resilient cover 36b to reduce the impact between the valve and the valve seat 34 and to prevent vibration or chattering during operation.

A chamber 11c is formed between the inner and outer valve seats. When the valve is in engagement with the outer valve seat, the chamber 11c is in communication with the pressure chamber 11 through the open port 11b, and when the valve is in engagement with the inner valve seat the chamber 11c is cut off from the pressure chamber 11.

The valve 36 is adapted to be actuated periodically by a resilient metal diaphragm 37 which is connected by a link 38 and a pivotal lever 39 to the upper end of the long valve stem 36a of the valve 36. The lever 39 has three arms, one of which is pivotally mounted at 40 to the housing 10, another of which is pivotally connected at 41 to the valve stem 38 and the other of which is pivotally connected at 42 to the link 38. The resilient metal diaphragm 37 separates a small semi-spherical chamber 43 from the pressure chamber 11. The chamber 43 is vented to atmosphere through the port 44.

The chamber 43 accommodates therein a compression spring 45 which acts upon the resilient metal diaphragm 37 in such fashion as to lift the valve 36 into engagement with the inner valve seat 34. The pressure exerted by the spring 45 can be varied by means of the adjustable set screw 46, which extends through the semi-spherical portion of the housing so as to be readily adjusted from the outside thereof. In order to insure quick closing of the valve 36, the valve stem 36a is acted upon by one or more springs 48.

The operation of the mechanism may now be described. When the system is operated and the gaseous fluid is withdrawn from the storage tank, the pressure in the conduit 13 will be quickly reduced, with the result that the fluid is exhausted from the chambers 16 and 17 through the passage 15. Because of the restricted orifice 16a, the chamber 17 is more quickly evacuated, and the differential pressure on the diaphragm causes the plunger to be displaced, thus unseating the valve 30 from the valve seat 31. Each time this happens, a small, but substantially uniform, quantity of the fluid within the pressure chamber 11 will be vented to atmosphere through the port 26. The plunger 22 is displaced but momentarily, however, because the vent 19 in the flexible diaphragm permits the pressure within the chambers 16 and 17 to be quickly equalized, with the result that the plunger is quickly restored to its normal raised position and the valve 30 is quickly restored to its closed position in engagement with the valve seat 31. Thus, each time the pneumatic system is operated or, in the case of an air brake system, each time the brakes are applied, there will be a slight reduction of the pressure within the accumulation chamber 11.

Ultimately, after a predetermined number of incremental reductions in the pressure within the pressure chamber 11, the pressure will be sufficiently reduced to a level at which the spring-urged resilient metal diaphragm 37 will be actuated in a snap-like manner to cause the valve 36 to be displaced from its valve seat, thus opening the discharge port 35 and permitting any liquid which has accumulated in the lower chamber 11c to be bled off. At the same time, the upper end of the valve stem 36a will come into engagement with the spring-urged check valve 14 to permit the pressure chamber 11 to be recharged with air and any moisture that may have accumulated within the storage tank. Since, while the valve 36 is in raised position, the upper resilient surface 36b of the valve will be held tightly against the inner valve seat 34, pressure will be permitted to build up within the pressure chamber. The pressure will ultimately overcome the action of the spring 45, and the snap-like operation of the resilient metal diaphragm 37 will restore the valve 36 against its valve seat to close the discharge port 35.

This sequence of operation continues so that during each application of the brakes, there is an incremental reduction of pressure in the pressure chamber 11, until ultimately the valve 36 is again opened to permit any moisture which has accumulated within the lower chamber 11c to be bled off. By proper adjustment of the set screw 46, the frequency of operation of the valve 36 can be controlled so that the moisture may be bled automatically from the system after a desired number of brake operations within the range made possible by the adjustment of the spring.

The sensitivity of the system is dependent upon the relative volumes of the chambers 16 and 17, and upon the relationship between the sizes of the orifices 16a and 19. The adjustable needle valve 16b, shown in Figure 2, makes it possible to vary the size of the orifice 16a. In this way, pulses that may occur in the system, not necessarily produced by the application of the brakes but, for example, by a reciprocating compressor, can be compensated for by varying the orifice 16a and making the system insensitive to pulses other than those produced by the application of the brakes.

The invention has been shown and described in preferred forms and by way of example only, and many variations and modifications may be made therein without departing from the spirit of the invention. For example, the mechanism may be used in conjunction with various types of pneumatic systems, and perhaps also with some types of hydraulic systems which require periodic bleeding. It is to be understood, therefore, that the invention is not to be limited to any specified form, except in so far as such limitations are set forth in the appended claims.

I claim:

1. A bleed device for a periodically operated fluid system comprising a pressure chamber, an inlet port therein communicating with the fluid system, a valve for regulating the admission of the fluid from the fluid system into the pressure chamber to charge the pressure chamber with fluid, a discharge port in said pressure chamber for bleeding the system, a valve normally closing said discharge port, means for reducing the pressure within the pressure chamber during each operation of the fluid system, and means controlled by the pressure within the pressure chamber for periodically opening the discharge valve after a plurality of operations of the fluid system.

2. A bleed device for a fluid system comprising a pressure chamber, a discharge port therein for bleeding the system, a discharge valve normally closing said discharge port, an inlet port for admitting fluid under pressure into the pressure chamber, a valve normally closing said inlet port, means controlled by the pressure within the pressure chamber for opening the discharge valve when the pressure in the pressure chamber drops below a certain level, means for incrementally exhausting the pressure within the pressure chamber, thereby ultimately reducing the pressure within the pressure chamber after a plurality of incremental reductions to the level which effects the opening of said discharge valve, and means responsive to the operation of the discharge valve for automatically opening the inlet valve, whereby the pressure within the pressure chamber is restored above the level necessary to close the discharge valve.

3. A bleed device for a fluid system as set forth in claim 2 wherein the means for incrementally exhausting the pressure within the pressure chamber comprises a pressure actuated diaphragm which is operated in response to a differential pressure on opposite sides thereof.

4. A bleed device for a fluid system comprising a pressure chamber, a discharge port therein for bleeding the system, a valve normally closing said discharge port, an inlet port communicating with a source of fluid under pressure, a valve normally closing said inlet port, means controlled by the pressure within the pressure chamber for controlling the operation of said discharge valve, whereby the valve remains closed when the pressure within the pressure chamber exceeds a certain level and the valve is opened when the pressure drops below that level, a second discharge opening in communication with said pressure chamber, a valve normally closing the flow of fluid from the pressure chamber through said second discharge opening, and means for momentarily opening the valve which normally closes said second discharge port, whereby the pressure within the pressure chamber is reduced in increments during each opening of the valve until the pressure within the pressure chamber is reduced to the level at which the valve which normally closes the first discharge port is opened.

5. A bleed device for a fluid system as set forth in claim 4 wherein the means for momentarily opening the valve which normally closes said second discharge port comprises a pressure actuated diaphragm movable in response to a differential pressure on opposite sides thereof, and means responsive to the movement of the diaphragm for opening the valve.

6. A bleed device for a fluid system as set forth in claim 5 including a restricted opening in said diaphragm so as to equalize the differential pressure on opposite sides of the diaphragm within a short time interval following the movement of the diaphragm.

7. A device for bleeding moisture periodically from a pneumatic system comprising a pressure chamber, an inlet port in communication with the pneumatic system, a first valve for regulating the flow through said inlet port into the pressure chamber, a discharge port for bleeding moisture from the pressure chamber, a second valve normally closing said discharge port, inner and outer valve seats for limiting the movement of the second valve, a chamber defined between said inner and outer valve seats, said chamber communicating with the pressure chamber when the second valve is in engagement with the outer valve seat and being cut off from the pressure chamber when the second valve is in engagement with the inner valve seat, pressure actuated means controlled by the pressure in the pressure chamber for operating the second valve, whereby the second valve is urged into engagement with the outer seat when the pressure within the pressure chamber exceeds a certain level and into engagement with the inner valve seat when the pressure drops below that level, means for reducing the pressure incrementally within the pressure chamber, ultimately rendering said pressure actuated means operative to move the second valve into engagement with said inner valve seat, thereby bleeding any moisture accumulated in the chamber defined between the inner and outer valve seats, and means operative in response to the actuation of the second valve for opening the first valve.

8. A device for bleeding moisture periodically from a pneumatic system comprising a pressure chamber, an inlet port thereto in communication with the pneumatic system, a valve for regulating the flow through the inlet port, a discharge port for bleeding moisture from the pressure chamber, a valve for regulating the flow through the discharge port, a diaphragm in communication with the pressure chamber, means connecting the diaphragm and the valve which regulates the flow through the discharge port, whereby the valve is held in closed position when the pressure within the pressure chamber exceeds a certain level and in open position when the pressure within the pressure chamber falls below that level, an exhaust passage from said pressure chamber to the atmosphere, a valve normally preventing flow through said exhaust passage, and means for momentarily opening the valve, whereby the pressure is reduced incrementally in the pressure chamber so that after a plurality of such valve operations the pressure in the pressure chamber is reduced to the level at which the valve which regulates the flow through the discharge port is opened to release any accumulated moisture.

9. A device for bleeding moisture periodically from a pneumatic system as set forth in claim 8 wherein the means for momentarily opening the valve which normally prevents flow through said exhaust passage comprises a diaphragm actuatable in response to a pressure differential on opposite sides thereof, and means operable in response to said differential pressure for operating the valve.

10. A device for bleeding moisture periodically from a pneumatic system as set forth in claim 9 including means for quickly equalizing the pressures on opposite sides of the diaphragm.

11. A device for bleeding moisture periodically from a pneumatic system as set forth in claim 8 including a spring which acts on the diaphragm in communication with the pressure chamber, and means to regulate the pressure exerted by said spring, thereby regulating the pressure at which the diaphragm is actuated to open the valve which regulates the flow through the discharge port.

12. A device for bleeding moisture periodically from a pneumatic system as set forth in claim 8 including means operable in response to the operation of the valve which regulates the flow through the discharge port for opening the valve which regulates the flow through the inlet port.

13. A device for bleeding moisture periodically from a pneumatic system comprising a pressure chamber, an inlet port thereto in communication with a pneumatic system, a spring urged first valve normally closing said inlet port, a discharge port for bleeding moisture from the pressure chamber, a second valve normally closing said discharge port, inner and outer valve seats for limiting the movement of the second valve, a chamber defined between said inner and outer valve seats, said chamber communicating with the pressure chamber when the second valve is in engagement with the outer valve seat and being cut off therefrom when the second valve is in engagement with the inner valve seat, a spring urged diaphragm in communication with said pressure chamber, a chamber separated from the pressure chamber by said diaphragm, a mechanical linkage connecting the diaphragm and the second valve, whereby the second valve is urged into engagement with the outer valve seat when the pressure within the pressure chamber exceeds a certain level and the second valve is shifted into engagement with the inner seat when the pressure drops below that level, an exhaust passage from said pressure chamber to the atmosphere, a spring urged third valve normally closed to prevent flow from said passage, a restriction between said valve and the pressure chamber, means for momentarily opening the third valve during each operation of the pneumatic system, whereby the pressure in the pressure chamber is reduced incrementally until the pressure reaches the level at which the diaphragm is actuated to open said second valve and move it into engagement with the inner valve seat, the opening of the second valve releasing any moisture accumulated in the pressure chamber, and means responsive to the operation of the second valve for opening the first valve, thereby recharging the pressure chamber to a pressure sufficiently high to actuate the diaphragm and restore the second valve into engagement with the outer valve seat.

14. A device for bleeding moisture periodically from a pneumatic system as set forth in claim 13 wherein the means for momentarily opening the third valve during each operation of the pneumatic system comprises a diaphragm, chambers formed above and below the diaphragm, a restricted opening in the diaphragm connecting the upper and lower chambers, a passage communicating with both of said chambers and with the source of fluid under pressure, whereby when the pneumatic system is actuated a pressure reduction is produced in said passage, a restriction between said passage and one of said chambers to cause the pressure in said chamber to reduce more slowly than the pressure in the other of said chambers when a pressure reduction occurs in said passage, thereby producing a pressure differential on opposite sides of said diaphragm, and a plunger carried by said diaphragm which, when the diaphragm is actuated in response to a pressure differential on opposite sides thereof, is displaced so as to unseat the third valve momentarily, the restricted opening in the diaphragm quickly equalizing the pressures on opposite sides of the diaphragm.

15. A device for bleeding moisture periodically from a pneumatic system as set forth in claim 14 including adjustable means for varying the size of the restriction between said passage and one of said chambers, said adjustable means varying the sensitivity of the system.

16. A device for bleeding moisture periodically from a fluid system comprising a chamber, a port in the lower region of chamber for the passage of a fluid therethrough, a closure normally preventing flow through said port, means operable periodically to change the pressure within the chamber by increments, an actuator controlled by the pressure within the chamber to open said closure after a plurality of incremental changes in the pressure within the chamber, a port establishing communication between the chamber and the fluid system, a closure normally preventing flow of fluid from the fluid system to the chamber, and means controlled by said actuator to open the closure for the port establishing communication with the fluid system and the chamber.

17. A device for bleeding moisture periodically comprising a pressure chamber having a port therein, a partition within the pressure chamber, an opening defined in said partition and spaced apart from said port, a valve movable from a position in which it closes the port to a position in which it closes the opening through said partition, means operable periodically to reduce the pressure within the pressure chamber by increments and an actuator controlled by the pressure within the pressure chamber for shifting the valve from the position closing the port to the position closing the opening in the partition after a predetermined reduction in the pressure within the chamber.

18. A device for bleeding moisture periodically as set forth in claim 17, including means operable to increase the pressure within the pressure chamber when the valve opens the port, said pressure being retained within the chamber by the closing of the opening in the partition by the valve, the pressure controlled actuator restoring the valve rapidly to its position closing the port when the pressure within the pressure chamber builds up to a predetermined level.

References Cited in the file of this patent

UNITED STATES PATENTS

| | | |
|---|---|---|
| 2,192,769 | Dach | Mar. 5, 1940 |
| 2,323,764 | Gustafsson | July 6, 1943 |
| 2,462,614 | De Witt | Feb. 22, 1949 |